INVENTORS
ROBERT A. KLEIST
JOHN SCARBROUGH
BY
Edward A. Robinson
ATTORNEY

May 14, 1963 R. A. KLEIST ETAL 3,090,042

INTERROGATOR-RESPONDER SIGNALLING SYSTEM

Filed Jan. 16, 1962 4 Sheets-Sheet 2

INTERROGATOR-RESPONDER SIGNALLING SYSTEM

Filed Jan. 16, 1962 4 Sheets-Sheet 3

May 14, 1963 R. A. KLEIST ETAL 3,090,042

INTERROGATOR-RESPONDER SIGNALLING SYSTEM

Filed Jan. 16, 1962 4 Sheets-Sheet 4

United States Patent Office 3,090,042 Patented May 14, 1963

3,090,042

INTERROGATOR-RESPONDER SIGNALLING SYSTEM

Robert A. Kleist, Woodland Hills, and John Scarbrough, Palo Alto, Calif., assignors to General Precision, Inc., Binghamton, N.Y., a corporation of Delaware Filed Jan. 16, 1962, Ser. No. 166,585
8 Claims. (Cl. 343—6.5)

This invention relates to communication systems wherein a passive responder device will respond to a signal generated by an interrogator station and will generate a coded response signal which will uniquely identify the responder device.

A co-pending patent application, Serial No. 739,909, filed June 4, 1958, now Patent No. 3,054,100, issued September 11, 1962, by Clarence S. Jones, entitled "Signalling System," and assigned to the same assignee as the instant invention discloses a basic interrogator-responder system capable of transmitting data between an interrogator station and one or more passive responder devices which are movable into a magnetic or inductive field established by the interrogator station. A further co-pending patent application, Serial No. 39,295, entitled "Interrogator-Responder Signalling System," filed June 28, 1960, by Robert A. Kleist, and assigned to the same assignee as the instant invention, discloses an improved single sideband interrogator system for identifying vehicles which pass along a pre-determined track or route. For example, a city bus carrying a responder device or response block may approach and pass over an interrogator location having tansmitter and receiver antenna loops embedded in the paving of a street. A coded response signal from the responder device may be received at the interrogator station and passed to a remote central office whereupon the identity of a bus passing a particular interrogator location will become known as the central office. Apparatus of the above described type has been marketed under the trademark "Tracer" by the assignee of this application.

An interrogator-responder signalling system may include several interrogator locations spaced along the several bus routes or tracks of a transportation system, and the identification data received from the various interrogator locations may be passed to a single computer at the central office location. Such a system requires communication channels for passing data from the various interrogator locations, and the cost of communication channels constitutes a major part of the cost of operation of the system. It is therefore desirable that several interrogator stations be coupled to share a common telephone line or other communication channel to the central office. Such an arrangement requires that the various interrogator receivers provide an unique identification signal over the communication channel such that the computer at the central office may identify the specific interrogator location in addition to the particular responder device which is being carried by a vehicle past that interrogator location. It is also desirable that another unique signal be passed to the central office computer to indicate the direction of travel of the vehicle past the interrogator location.

It is an object of this invention to provide an improved interrogator-responder signalling system for passing coded response signals which will (1) uniquely identify the responder device and the vehicle carrying the responder device, (2) uniquely identify the receiver and the interrogator location through which the vehicle is passed, and (3) indicate the direction of travel of the vehicle in passing the interrogator location.

Another object of this invention is to provide a transmitter and receiver inductive loop configuration which is capable of simultaneously receiving two similar response signals each of which may be coded to provide a part of the vehicle identification, and which may further provide an indication of the direction of travel of the vehicle by a determination of which of the two response signals is first received.

Numerous other objects and advantages will be apparent throughout the progress of the specification which follows. The accompanying drawings illustrate a certain selected embodiment of the invention and the views therein are as follows.

Figure 3:
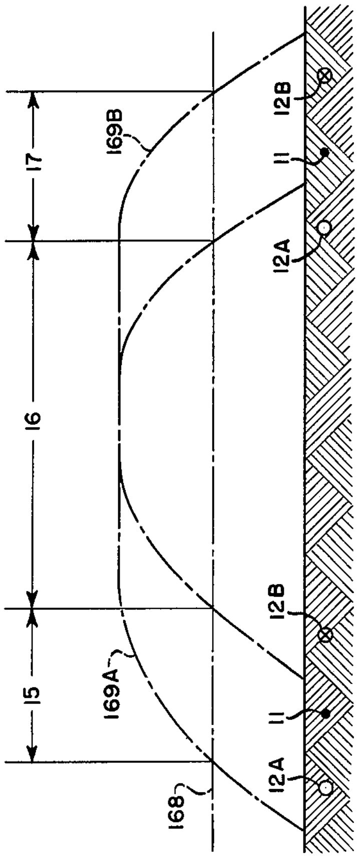
FIGURE 3 is a vertical section taken along the plane 3—3 of FIGURE 1 and indicating the response characteristics of the receiver loops of this invention.

Briefly stated, according to a preferred embodiment of this invention, an interrogator signal comprising a carrier frequency and a plurality of sideband frequencies is transmitted by a rectangular conductive loop 11 embedded in the paving of a street. A pair of receiver loops 12A and 12B are likewise embedded in the paving in an overlapping arrangement with the transmitter loop 11. The receiver loops 12A and 12B essentially define three areas along the route or path to be traveled by a bus or other vehicle 13 carrying a responder device 14 thereon. A first of the areas 15 is enclosed by the first receiver loop 12A, but is outside of the other receiver loop 12B. A second area is enclosed by both receiver loops 12A and 12B. The third area 17 lies outside of the first receiver loop 12A but within the loop 12B. As shown by FIGURE 3, the response characteristics of the receiver loops 12A and 12B provide an overlapping pattern with a substantial area 16 wherein response signals will be received by both receivers, but having the further areas 15 and 17 wherein signals may be received by only one receiver. The output signals from each receiver 19A and 19B include audio frequencies which are passed by an amplifier 20 to the central office computer, and further include direct potential switching levels for activation of switches 21A and 21B. The switches 21A and 21B are cross coupled by a circuit means 22 such that the first switch to operate will inhibit and prevent operation of the second switch. A selective audio frequency generating means 24 will provide a direction-of-travel signal determined by a selective operation of the switches 21A or 21B. The amplifier 20 will pass audio signals to the central office decoder from both receivers 19A and 19B identifying the vehicle 13, from the circuit 24 indicating the direction-of-travel, and possible further audio frequencies to identify the particular response location.

Figure 1:
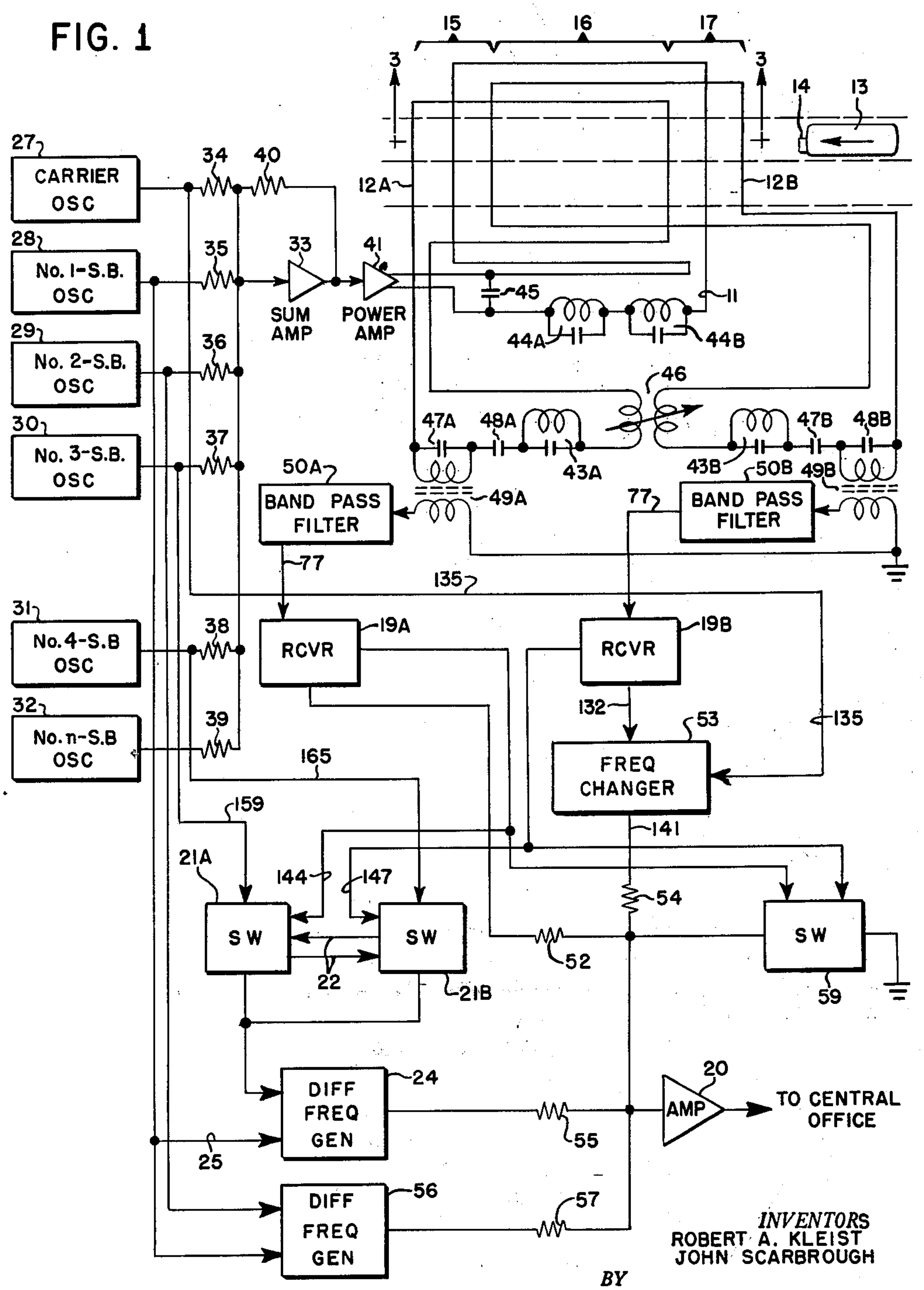
FIGURE 1 is a schematic diagram of the interrogator-responder system of this invention including a plan view of the inductive loop arrangement in the path of vehicles to be interrogated.

The interrogator signal includes a carrier frequency which is generated by a carrier signal oscillator 27, and a plurality of sideband frequencies generated by individual oscillators 28 through 32, FIGURE 1. Each of the circuits 27 through 32 may be a conventional radio frequency oscillator, but it is contemplated that these oscillators may be constructed in accordance with a co-pending patent application entitled "Crystal Controlled Transistorized Oscillator," Serial No. 15,914, filed on March 18, 1960, by Clarence S. Jones and John Scarbrough, and assigned to the same assignee as the instant invention. The radio frequency output signal from each of the oscillator circuits 27 through 32 is coupled to a summing amplifier 33 by summing resistors 34 through 39. The summing amplifier 33 may be a conventional operational amplifier as used in analog computing circuits, and may include a feedback resistor 40. The carrier frequency is directly combined with the sideband frequencies and passed via a power amplifier 41 to the transmitter loop 11. Thus, the interrogator signal includes a carrier frequency and a plurality of sideband frequencies which are directly combined and which effectively constitute a single sideband modulated carrier. This method of single sideband modulation is described in a co-pending patent application entitled "Interrogator-Responder Signalling System," Serial No. 15,597, filed March 17, 1960, by Robert A. Kleist, now Patent No. 3,036,295, and assigned to the same assignee as the instant invention.

As shown in FIGURE 1, the transmitter loop 11 and the two receiver loops 12A and 12B lie in a horizontal plane mutually overlapping, and it is necessary to provide de-coupling networks to prevent any of the loops from adversely affecting the other two. If no de-coupling arrangement is provided, the two receiver loops 12A and 12B will appear as shorted turns magnetically coupled to the transmitter loop 11 and would unduly load the transmitter and cause inefficient operation thereof. Each of the receiver loops 12A and 12B is provided with a parallel tuned circuit or wave trap 43A and 43B. The tuned circuits 43A and 43B each comprise an inductive element coupled in parallel with a capacitor, and are connected in series with the respective loops 12A and 12B whereby the receiver loops 12A and 12B appear as open circuits for the frequency of the interrogator signal.

In a similar manner, the transmitter loop 11 may appear as a shorted turn inductively coupled to the two receiver loops 12A and 12B. A pair of filter circuits or wave traps 44A and 44B each comprising an inductive element connected in parallel with a capacitor are connected in series with the loop 11. Since each filter trap 44A and 44B is tuned to a respective one of the interrogator response frequencies, the transmitter loop 11 is effectively open circuited for these frequencies. A capacitor 45 is coupled across the inductive loop 11 to provide a broad tuning for the loop at the frequencies of the carrier oscillator and the various sideband oscillators 27 through 32. Obviously, the two receiver loops 12A and 12B being in the same plane and partially overlapping, will have mutual inductance or magnetic coupling therebetween. An air core transformer 46 provides a similar mutual coupling of opposite phase and has respective windings coupled in series with the loops 12A and 12B. By adjustment of the transformer 46, the mutual coupling between the loops 12A and 12B may be effectively cancelled by the opposite mutual coupling of the transformer.

A pair of serially coupled capacitors 47A and 48A, together with a transformer 49A provide an impedance matching network between the inductive loop 12A and the receiver 19A. Similar elements 47B, 48B and 49B provide impedance matching between the loop 12B and the receiver 19B. Two bandpass filters 50A and 50B may be broadly tuned to pass the spectrum of radio frequencies associated with the response signal, and the receiver response characteristics are sharpened to these frequencies.

It is contemplated that each response signal passed to the receiver 19A or 19B will comprise a response frequency modulated by a selected three of a possible 10 audio frequencies. Thus, the signals are coded in a "3-out-of-10" code which will each provide 120 unique combinations for vehicle identification. Of the 120 possible combinations, 100 combinations may be used to provide a printed output of two decimal digits. The combination of signals received by both receivers 19A and 19B will therefore include 100×100 unique combinations totalling 10,000 possible outputs for vehicle identification. The actual decoding of the "3-out-of-10" codes to provide the decimal output may be accomplished by the central office computer in a manner which was generally disclosed by the patent application Serial No. 39,295, supra.

The audio tones reproduced by the receiver 19A may be directly passed to the telephone line amplifier 20 through a coupling resistor 52. On the other hand, the audio tones de-modulated by the receiver 19B must be altered by a frequency changing circuit 53, to be described subsequently, and the altered frequencies are passed to the amplifier 20 via a coupling resistor 54. A further selected audio tone indicating the direction of travel of the vehicle is generated by the circuit 24 and passed to the amplifier 20 via a coupling resistor 55. One or more additional audio tones for the purpose of identifying the particular interrogator location to the central office may be generated by one or more circuits 56 in a manner to be described subsequently, and may be passed to the amplifier 20 via a resistor 57.

The composite signal passed by the telephone line amplifier 20 therefore includes a plurality of selected audio tones which provide the unique identification of the vehicle, the direction of travel, and identification of the interrogator station. A switch 59 coupled to the amplifier 20 normally provides a short circuit to ground as indicated in FIGURE 1, and prevents operation of the amplifier 20. This switch is coupled to the direct potential output terminals of both receivers 19A and 19B, and will prevent operation of the amplifier 20 until the responder device 14 has entered into the area 16 whereupon both receivers 19A and 19B are simultaneously operative. Normally, the output signals from any particular interrogator station will comprise a burst of audio tones which will have a duration of less than 0.1 of a second. Once the burst of signals has been transmitted over the communication channel, to the central office, no further signals will be transmitted from that particular interrogator station until the responder device 14 has moved away from the loops 12A and 12B whereupon the interrogator station will again be responsive to any further responder device. Means may be provided for preventing operation of the amplifier 20 when the communication circuit is already in use by another interrogator station. In the event that two different vehicles move into interrogator stations simultaneously, the station which first receives a complete response signal will provide a first burst of audio tones over the communication channel while the second interrogator station remains inactive for the 0.1 second interval required by the first interrogator station for transmission of its signals. Ordinarily, a vehicle will not traverse the interrogator loop area 16 in less than one second, and therefore, the identification information will not be lost even though the communication channel is busy at the outset.

Figure 2:
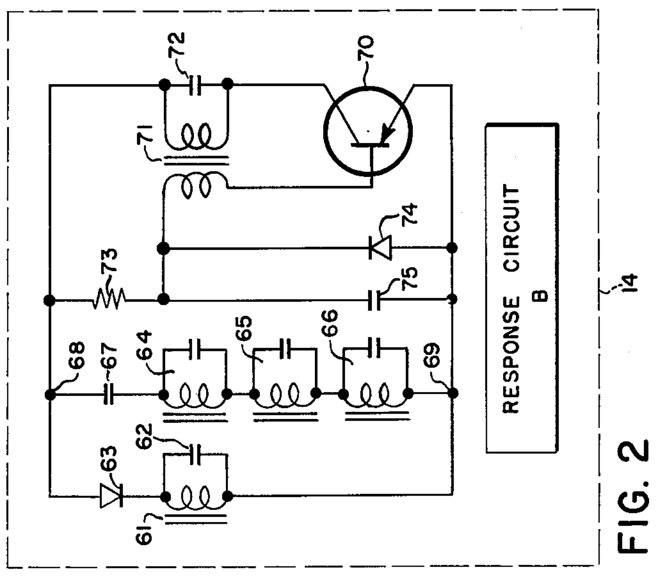
FIGURE 2 is a diagram of a double response block or passive responder device which may be carried by a vehicle to be identified.

The responder device 14 as illustrated in FIGURE 2 may include a pair of passive response circuits. The first circuit is shown in detail by the upper part of FIGURE 2, and the second circuit is indicated by the block labeled "Response Circuit B" which will be understood to include a structure similar to the first response circuit. Each response circuit includes an inductance 61 and a capacitor 62 constituting a tuned circuit tuned to be resonant at the frequency of the interrogator signal. When the responder device 14 moves within the field of the interrogator loop 11, a mutual coupling between the loop and the inductor 61 will cause oscillation in the circuit 61—62. A diode 63 de-modulates the interrogator signal to generate a direct potential from the carrier frequency and ten audio tones from the sideband frequencies. Three filter traps, 64, 65 and 66 are serially connected with each other and with a capacitor 67 to provide attenuation paths for all of the audio tones except for a selected three to which the circuits 64, 65 and 66 are tuned. The capacitor 67 will block the flow of direct current in the attenuation path. In any particular response circuit a direct potential will exist between points 68 and 69 together with three of the audio tones which are selected by the filters 64, 65 and 66.

A transistor 70 together with a tuned circuit including a transformer 71 and a capacitor 72 constitutes a response oscillator. A resistor 73 and a diode 74 provide a direct potential bias to sustain oscillation of the response oscillator, and a capacitor 75 provides a radio frequency bypass between the base electrode and the emitter electrode of the transistor 70. The frequency of the response circuit is determined by the tuning of the resonant circuit 71—72, and the ferrite core of the transformer 71 will provide a mutual coupling between the response circuit and one of the receiver loops 12A or 12B (FIGURE 1). In an exemplary form of this invention, the interrogator frequency as determined by the carrier oscillator 27 was established at 90 kilocycles and the first response frequency established by the oscillator 70, 71 and 72 was equal to 235 kilocycles. The response circuit B of FIGURE 2 is identical to the response circuit A described above with the exception of the fact that the response oscillator is tuned to a different frequency, i.e., 223 kilocycles.

The response circuits of the device 14 will be inductively or magnetically coupled to the loops of the interrogator station through ferrite cores associated with the inductance 61 and the transformer 71. The responder device may be mounted against a vertical wall (preferably the front end) of the vehicle, such that the ferrite cores are positioned vertically. With the ferrite cores of the elements 61 and 71 vertical, there is a maximum inductive coupling with the interrogator loops which are in a horizontal plane embedded in the paving of the street. When the responder device is over the loops of the interrogator station, the inductance 61 is magnetically coupled to the transmitter loop 11, and the transformer 71 is magnetically coupled to one of the receiver loops 12A and 12B. Because the cores are vertical, the orientation of the vehicle with respect to the traffic lanes is of no consequence, and therefore, the vehicle may go diagonally across the interrogator location (i.e., changing lanes to pass another vehicle or an obstruction) without decreasing the coupling or effective signal strength between the responder device and the interrogator station. Because the responder device is mounted outside on a wall of the vehicle, it has been found that there is less adverse effect due to distortion of the magnetic fields of the loops by the metallic mass of the vehicle.

Figure 4:
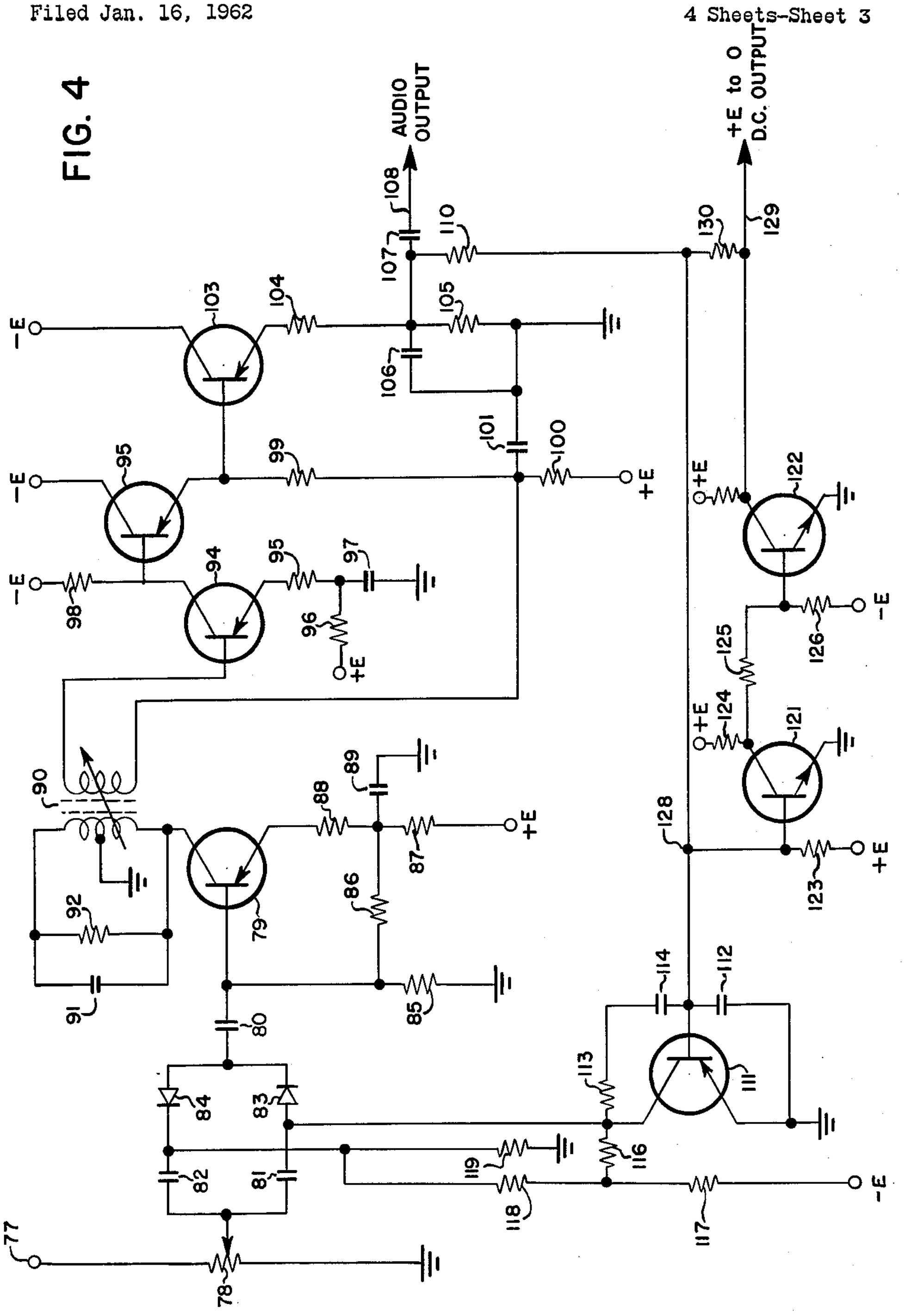
FIGURE 4 is a complete circuit diagram of each of the receivers A and B which are shown in block form in FIGURE 1.

The operation of the receivers 19A and 19B may be understood with reference to FIGURE 4. The response signal is impressed upon an input terminal 77 by means of the coupling network and bandpass filter previously described. An input potentiometer 78 provides a gain control for the receiver. The input signals are coupled to a transistor 79 by a coupling capacitor 80 and by a diode bridge network including capacitors 81 and 82 and diodes 83 and 84. The base electrode and the emitter electrode of the transistor 79 are biased by a resistive network including resistors 85, 86 and 87. The emitter electrode is coupled thereto by a resistor 88 and a capacitor 89 bypasses the radio frequency currents to ground. A transformer 90 and a capacitor 91 together with a resistor 92 provide a tuned circuit coupled to the collector electrode of the transistor 79. The transistor 79 together with the tuned circuit 90—91 constitutes a stage of tuned radio frequency amplification (TRF). In an exemplary embodiment of this invention, a receiver was constructed having several such TRF amplification stages, but for the sake of simplicity, this particular application shows one such stage.

A further stage of amplification is accomplished by two transistors 94 and 95. The base electrode of the transistor 94 is directly coupled to the transformer 90 of the preceding TRF stage. The emitter electrode of the transistor 94 is coupled to a positive reference potential by resistors 95 and 96. A capacitor 97 bypasses the resistor 96 to an alternating potential ground. The collector electrode of the transistor 94 is coupled to a negative reference potential by a load resistor 98, and is directly connected to the base electrode of the transistor 95. The transistor 95 is coupled as an emitter follower with the collector electrode directly connected to the negative reference potential, and with the emitter electrode coupled to the positive reference potential by resistors 99 and 100. A capacitor 101 bypasses the resistor 100 to a point of alternating potential ground, and the lower terminal of the secondary winding of the transformer 90 is likewise bypassed to ground.

A transistor 103 is coupled to receive the RF signal from the transistor 95 and functions as a detector or demodulating circuit. This transistor is connected as an emitter follower with the collector electrode directly connected to the negative reference potential and with the emitter electrode coupled to ground potential by resistors 104 and 105. A capacitor 106 bypasses the resistor 105. A coupling capacitor 107 passes the audio tones to an output terminal 108.

A resistor 110 and a transistor 111 constitute an automatic gain control (AGC) coupling between the output circuit of the receiver and the diode bridge network of the input circuit. A capacitor 112 essentially filters the AGC circuit by bypassing alternating currents therefrom to ground. An RC network including a resistor 113 and a capacitor 114 provide further attenuation of alternating currents between the collector electrode and the base electrode of the transistor 111. The collector electrode of the transistor 111 is coupled to a negative reference potential by resistors 116 and 117. Further resistors 118 and 119 provide a coupling network between the AGC transistor 111 and the diode bridge network of the receiver input circuit.

A pair of transistors 121 and 122 develop a direct current output for switching purposes, and provide a hysteresis characteristic for stabilization of the receiver. The base electrode of the transistor 121 is coupled to a positive reference potential by a resistor 123 and is directly connected to the AGC circuit. The transistor 121 is normally conductive such that a substantial voltage drop appears across a load resistor 124 and the collector electrode is normally at ground potential. The base electrode of the transistor 122 is coupled to the collector electrode of the transistor 121 by a resistor 125, and to a negative reference potential by a resistor 126. The transistor 122 is normally non-conductive since the base electrode is held below ground potential by the negative reference potential and by the fact that the collector electrode of the normally conductive transistor 121 is substantially ground potential.

The AGC line 128 is normally at zero or ground potential, and during times when signals are impressed upon the receiver the potential of the AGC drops to a negative value. The negative potential impressed upon the base electrode of the transistor 121 renders this transistor nonconductive whereupon the potential of the collector electrode rises to the positive reference value, and the potential of the base electrode of the transistor 122 likewise becomes positive in value. With a positive bias being applied to the base electrode, the transistor 122 will become conductive such that the voltage of the collector electrode will drop to substantially zero or ground potential. The collector electrode is directly connected to the D.C. output terminal 129, and therefore, the normal direct potential output level equals the positive reference potential, +E, when no signal is present in the amplifier. When a signal is present, the D.C. output voltage drops to zero or ground value. A resistor 130 couples the direct voltage output to the AGC line 128 and to the base electrode of the transistor 121. The resistor 130 provides a slight positive feedback for the direct current circuit of the transistors 121 and 122 such that the circuit partially holds itself in a state of conduction once an input signal appears at the receiver. This provides a hysteresis effect which adds stability to the AGC system and to the direct voltage output from the receiver, since the receiver will remain off or inoperative until a signal of a pre-determined minimum strength is received, and then the receiver will turn on and remain operative.

The receivers 19A and 19B may be each tuned to a separate response frequency to pick up the signal from a different circuit of the responder device 14. However, in each case the audio signals passed from the receivers 19A and 19B is similar in that a selected three of the same possible ten audio tones will be reproduced. Obviously, it is necessary to modify the tones from one of the receivers such that they (the tones) will be distinguishable at the central office decoder from the tones of the other receiver. This is accomplished by the frequency changer circuit 53 which is more fully shown in FIGURE 6.

Figure 6:
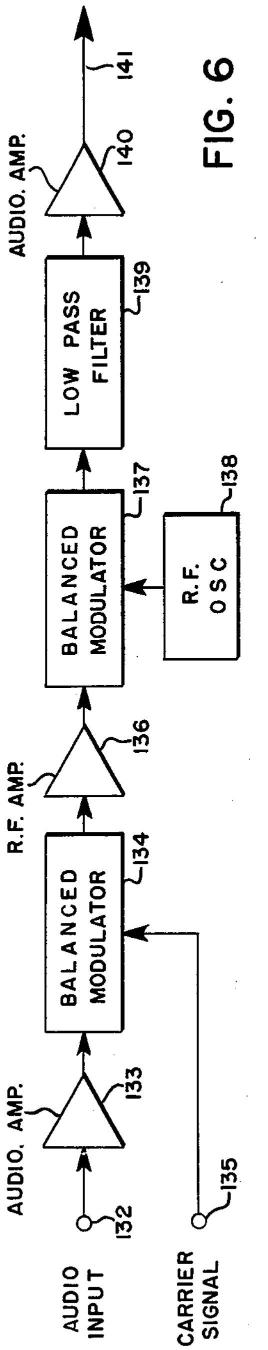
FIGURE 6 is the circuit diagram for a frequency changing circuit shown as a block in FIGURE 1.

The frequency changer of FIGURE 6 receives the selected audio tones at an input terminal 132, and an audio amplifier 133 passes these selected tones to a balanced modulator circuit 134. The balanced modulator circuit may be similar to a modulator which is shown and described in a textbook entitled "Information Transmission Modulation and Noise," by Mischa Schwartz, published by the McGraw-Hill Book Company in 1959, with specific reference to section 4–3, beginning on page 164. The balanced modulator 134 combines the audio tones with the carrier signal received by a lead 135 from the carrier oscillator circuit 27 (see FIGURE 1). The output from the balanced modulator 134 comprises the carrier signal upon which the selected three audio tones are modulated, and this output signal is passed by a radio frequency amplifier 136 to another balanced modulator circuit 137 which may be similar in form to that of 134. The balanced modulator 137 combines the modulated carrier signal with another radio frequency signal developed by an oscillator circuit 138. The combined signal is passed through a low pass filter 139 to eliminate the radio frequency portion thereof and to obtain further audio signals which are passed by a final audio amplifier 140 to an output lead 141. Since the frequency of the oscillator 138 and the carrier signal fed to the frequency changer circuit via the lead 135 are somewhat different, the effect of this frequency changer circuit is to first beat the audio signals with the radio frequency of the carrier wave, and thence to beat the combined signals with another radio frequency to obtain a final set of selected audio frequencies which differ from the frequencies received by the receiver 19B.

In an exemplary embodiment of this invention, the carrier signal was established at 90 kilocycles, and the frequency of the oscillator 138 was established at 93.05 kilocycles. The various audio frequencies used by this exemplary embodiment are as follows:

| Audio channel: | Frequency, c.p.s. |
|---|---|
| 1 | 1050 |
| 2 | 1150 |
| 3 | 1250 |
| 4 | 1350 |
| 5 | 1450 |
| 6 | 1550 |
| 7 | 1650 |
| 8 | 1750 |
| 9 | 1850 |
| 10 | 1950 |
| ID–1 | 600 |
| ID–2 | 700 |
| Northbound (or Eastbound) | 800 |
| Southbound (or Westbound) | 900 |
| 1M | 2000 |
| 2M | 1900 |
| 3M | 1800 |
| 4M | 1700 |
| 5M | 1600 |
| 6M | 1500 |
| 7M | 1400 |
| 8M | 1300 |
| 9M | 1200 |
| 10M | 1100 |

The first ten channels above include audio tones which were obtained from detecting the response frequencies and were initially determined by the difference between the 90 kilocycle carrier and the sideband frequencies of the oscillators 28 through 32. Although only five such sideband oscillators are shown in FIGURE 1, any desired number of oscillators may be used, and in the above example, there were ten such oscillators. The channels 1M through 10M are the modified frequencies generated by the frequency changer circuit 53, and are derived from the first ten channels which were de-modulated by the receiver 19B.

The receiver identification channels ID–1 and ID–2 may be selectively derived from a difference frequency generating circuit(s) 56. These signals are beat frequencies obtained by combining the outputs from a first sideband oscillator 28 and one or more other sideband oscillators such as 29. The "northbound" and "southbound" direction indicating signals are also obtained as the beat frequencies between a selected two of the sideband oscillators.

Figure 5:
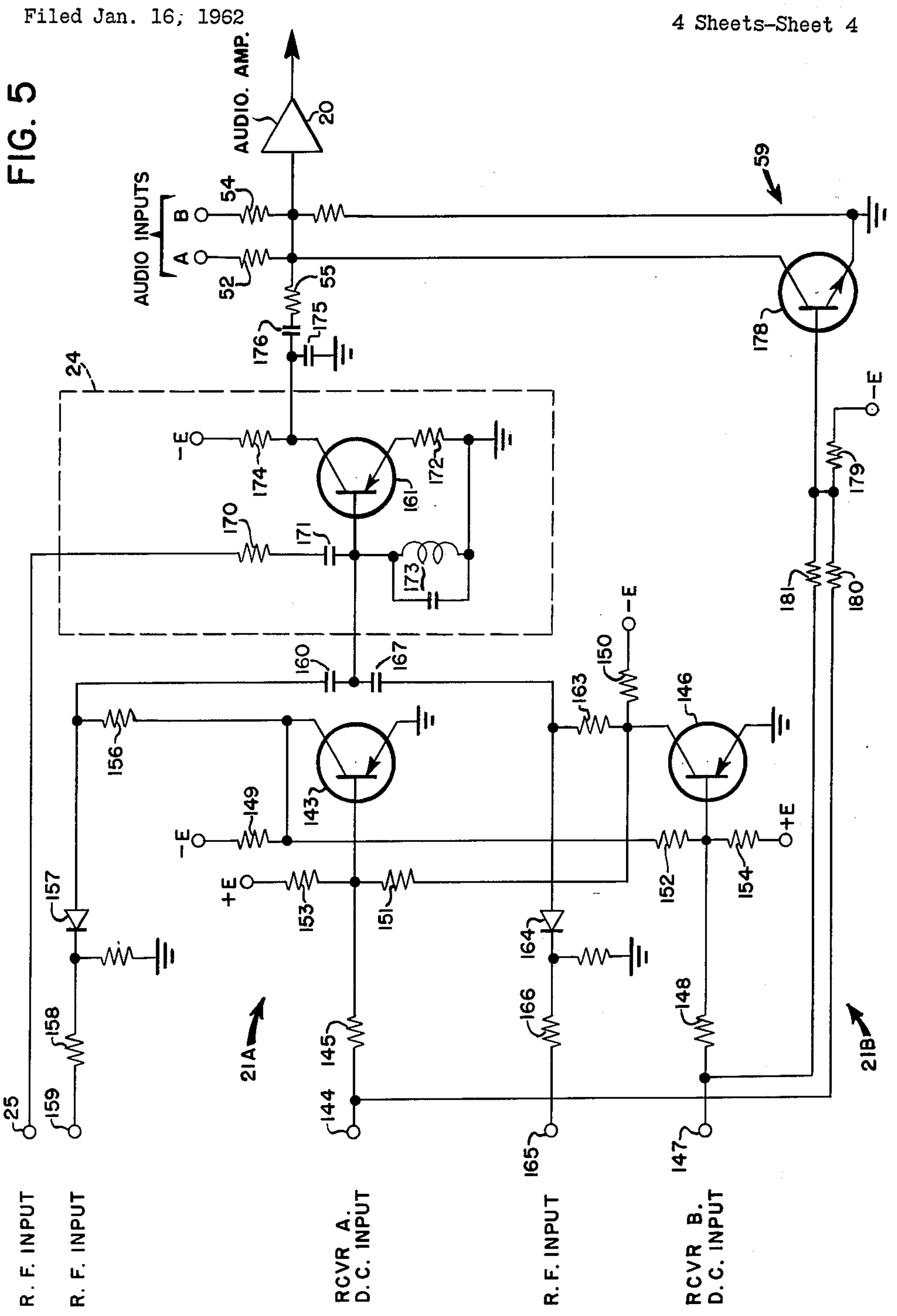
FIGURE 5 is a complete circuit diagram of the switch and gate circuits and difference frequency generating circuits which are shown as blocks in FIGURE 1.

FIGURE 5 illustrates the circuit of the switches 21A and 21B, the difference frequency generator 24 and the switch 59 all shown as blocks in FIGURE 1. The switch 21A comprises a transistor 143 which is coupled to a direct current input lead 144 from the receiver 19A by a resistor 145. Similarly, the switch 21B comprises a transistor 146 having a base electrode coupled to a direct current input terminal 147 via a resistor 148. Normally, both the transistors 143 and 146 are non-conductive and the collector electrodes thereof will assume a negative reference voltage since each is coupled thereto by a resistor 149 or 150. The normally negative voltage of the collector electrode of the transistor 146 is coupled to the base electrode of the transistor 143 by a resistor 151, andl the normally negative voltage of the collector electrode of the transistor 143 is coupled to the base electrode of the transistor 146 by a resistor 152. The resistors 150 and 151 and further resistors 153 and 145 normally provide a potential dividing circuit between the negative reference potential and the positive reference potential. The positive reference potential normally applied to the input terminal 144 has a greater influence upon the biasing of the base electrode of the transistor 143 than the potential applied through the resistor 153, since the resistor 153 is substantially greater in value than the resistor 145. Similarly, the resistors 149 and 152 together with a resistor 154 and 148 normally provide a further potential dividing network for biasing the base electrode of the transistor 146. In this manner, both base electrodes of the transistors 143 and 146 are biased positively and the transistors are both rendered non-conductive.

If we assume, by way of example, that a signal is first passed by a receiver 19A, the direct voltage level of the input terminal 144 will drop from a positive reference value to a zero value, and this change of voltage will be coupled to the base electrode of the transistor 143 by the resistor 145. A resistive network including the resistors 145, 150 and 151 and 153 are such that when the input voltage drops to zero, the base electrode of the transistor 143 will be biased negatively with respect to ground, and the transistor 143 will become conductive. When the transistor 143 conducts, the collector electrode thereof assumes a voltage which is substantially zero or ground voltage, and this eliminates the effect of the negative reference potential coupled thereto by the resistor 149. Since the negative reference potential is effectively removed from the collector electrode of the transistor 143, the resistor 152 couples this change of potential to the base electrode of the transistor 146 and to prevent conduction therein. Thus, it may be appreciated that conduction through the transistor 143 prevents conduction through the transistor 146. By similar logic it may be seen that conduction through the transistor 146 will prevent conduction through the transistor 143. Thus, if conduction is initiated in either of the transistors 143 or 146, that transistor which first conducts inhibits or prevents conduction in the other transistor.

Continuing the above example wherein the receiver 19A was the first to pass signals such that conduction was initiated in the transistor 143, the change in the collector voltage (from +E to zero) is coupled via a resistor 156 to bias a diode 157 and to permit conduction therethrough. A resistor 158 provides a coupling between the diode 157 and an input terminal 159 connecting to the oscillator 30 (see FIGURE 1). With the diode 157 conductive the oscillator signal is passed via a capacitor 160 to the base electrode of a transistor 161. On the other hand, if the transistor 146 has become conductive, the collector voltage therefrom coupled via a resistor 163 would have biased a diode 164 into conduction, and a signal from the oscillator circuit 31 would have passed via a lead 165, a resistor 166, the diode 164 and a capacitor 167 to the transistor 161. Therefore, the transistor 161 will receive a selected one of the oscillator signals depending upon which transistor 143 or 146 was first to become conductive.

As indicated heretofore, FIGURE 3 illustrates the response characteristics of the receivers 19A and 19B as related to the physical layout of the conductive loops 11, 12A and 12B. A dashed line 168 represents the threshold level at which the receivers 19A and 19B will generate signals to cause operation of the switches 21A, 21B and 59. A curve, 169A, is representative of the response characteristics of the receiver 19A, and it will be appreciated that the area 15 is defined generally to be within the loop 12A but outside the loop 12B; however, this may be more precisely defined as that area wherein the signal strength of the curve 69A exceeds the threshold level 168. Similarly, a curve 169B corresponds with the response characteristics of the receiver 19B and is generally within the area of the loop 12B. It may be appreciated that the areas 15, 16 and 17 may represent signal response characteristics, but in a more practical sense, these areas coincide with the loop conductors or boundaries. Thus, when a responder device 14 moves to a position immediately over an area bounded by a loop, it may be said to be "within the loop," and conversely, a responder device is deemed "outside the loop" when carried by the vehicle beyond the loop boundaries. In all such cases, the responder device is carried by the vehicle at a height of the order of two feet above the actual plane of the loop which is approximately one inch below the street surface.

The difference frequency generating circuit 24 receives a first radio frequency signal from the oscillator 28 via a lead 25, a resistor 170 and a capacitor 171. This radio frequency signal is combined with the signal from the input leads 159 or 165 depending upon which of the transistor-diode switches 21A or 21B have become conductive. The emitter electrode of the transistor 161 is coupled to the ground reference potential by a resistor 172 and the base electrode of the transistor 161 is coupled to the ground reference potential by a tuned circuit 173 including a capacitor and an inductance. The circuit 173 is tuned broadly to the radio frequencies of the sideband oscillators. The transistor 161 essentially detects the combined signals of the two radio frequency oscillators to develop the audio beat frequency difference signal therefrom. Since the control electrodes of the transistor 161 are not biased with direct potential levels, this transistor will operate only upon the negative lobes or wave portions impressed upon the base electrode thereof, and as such will be essentially a class B amplifier. The collector electrode of the transistor 161 is coupled to a negative reference potential by a load resistor 174 and is coupled to ground potential by a capacitor 175. The capacitor 175 effectively bypasses the radio frequency currents to ground, and the audio frequency is filtered therefrom. The audio output frequency is effectively the difference between the two input radio frequencies, and this output signal is passed to the audio amplifier 20 via a capacitor 176 and the resistor 55 together with other audio input signals from the receivers 19A and 19B.

In summary, the means for generating and passing an audio tone signal indicative of the direction of travel of the vehicle, includes the arrangement of the receiver loops 12A and 12B such that one receiver will pass signals before the other receiver, and the arrangement of the switches 21A and 21B such that the switch which first receives signals will operate and will effectively pre-empt or inhibit the other switch from operating. The switches 21A and 21B include the transistor-diode combinations 143—157 and 146—164 which will selectively pass R.F. signals from the oscillator 30 or the oscillator 31. The direction indicating audio tone is generated by the circuit 24 which combines the R.F. signal from the oscillator 28 with the R.F. signal selectively passed by the switch 21A or 21B (the diode 157 or 164). Since the circuit 24 generates an audio tone which is the difference between the R.F. frequencies, the frequency of the tone is determined by which of the switches 21A or 21B operates, and the switch operation is determined by which of the loop areas 15 or 17 is first entered by the responder device 14.

The difference frequency generator 24 shown in detail as a part of FIGURE 5 may be substantially duplicated to provide the difference frequency generator 56. Indeed, as indicated heretofore, particular interrogator stations may or may not include the circuit of the difference frequency generator 56. For example, if two interrogator stations were coupled to share a single communication channel to the central office, one of the interrogator stations need have no difference frequency generator since the absence of any audio tone would identify one interrogator station while the presence of such a tone would identify another station. The use of two identification frequencies as indicated in the foregoing table, four different interrogator stations may share the same communication channel, and will identify themselves by the presence or absence of these particular tones. In such case, one of the interrogator stations would require two separate difference frequency generators. By providing a third possible station identification signal, it would be possible for eight interrogator stations to share the same communication channel by use of a binary coded arrangement.

As indicated heretofore, the audio signals from an interrogator station are not passed to the central office decoder until the responder device 14 has moved into the area 16 to activate both receivers 19A and 19B. The switch 59 comprises a transistor 178 which is normally conductive to effectively ground the summing input to the amplifier 20. The emitter electrode of the transistor 178 is directly connected to the ground reference potential, and the base electrode thereof is coupled to a negative reference voltage by a resistor 179, and is further coupled to the input terminals 144 and 147 via resistors 180 and 181. Normally, the input voltage levels of the input leads 144 and 147 are equal to the positive reference potential, +E, and therefore, the transistor 178 is normally biased into conduction. When the responder device 14 enters one of the receiver loops (the area 15 or the area 17), one of the input levels of the terminals 144 or 147 will drop from the positive reference potential to zero, but because of the effect of the other positive reference potential, the transistor will remain conductive. However, if the responder device 14 moves into area 16, both receivers will pass signals and the input potential of both terminals 144 and 147 will drop to a zero value. In this event, the base electrode of the transistor 178 becomes negatively biased with respect to the emitter electrode, and the transistor 178 is rendered non-conductive. With the transistor 178 non-conductive, the ground connection is removed from the input of the amplifier 20, and the audio frequencies are permitted to pass therethrough. It may be appreciated that the switch 59 effectively operates as an AND gate to pass the audio signals only during times when both receivers 19A and 19B have become operative.

The interrogator-responder system described heretofore, is capable of uniquely identifying responder devices and vehicles carrying such devices using two separate three-out-of-ten codes such that the combination will produce a total of 10,000 unique combinations for purposes of identification. Certain simplifications on this system are possible if merely 100 unique combinations are required. In such a case, the responder device 14 of FIGURE 2 may include only one passive response oscillator circuit and the response circuit B indicated in this figure may be eliminated. In this case, both of the receivers 19A and 19B will be tuned to the same response frequency, but the audio output from one of the receivers 19B and the frequency changing circuit 53 may likewise be eliminated. In the simplified case of one response circuit, the audio frequencies representative of two decimal digits will be passed by the receiver 19A and the receiver 19B may be simplified to merely provide the direct potential output via the lead 147 to the switches 21B and 59. The simplified system would provide two decimal digits rather than four decimal digits for identification and in such case the loop configuration with the areas 15, 16 and 17 together with the dual receivers and switches would continue to function in a direction sensing capacity.

Changes may be made in the form, construction and arrangement of the parts without departing from the spirit of the invention or sacrificing any of its advantages, and the right is hereby reserved to make all such changes as fall fairly within the scope of the following claims.

The invention is claimed as follows:

1. An interrogator-responder signalling system comprising a transmitter operable to generate an interrogator signal, a first receiver, a second receiver, and a responder device movable into spaced relation with the transmitter and the receivers, said responder device being operable to detect the interrogator signal and to generate a coded response signal, each of said receivers including an inductive loop for receiving the response signal, the inductive loops being arranged to partially overlap such that three areas are defined into which the responder device may move, a first of the areas being included within the loop of the first receiver and outside the loop of the second receiver, a second of the areas being within both receiver loops, and the third area being outside the loop of the first receiver and within the loop of the second receiver.

2. An interrogator-responder signalling system comprising an interrogator station at a fixed location along the path of a vehicle to be identified and a responder device movable with the vehicle along the path and into spaced relation with the interrogator station, said interrogator station including a transmitter and an inductive loop associated with the transmitter for generating an interrogator signal, said responder device including means for detecting the interrogator signal and means for generating a coded response signal identifiable with the vehicle, said interrogator station including a first receiver having a first inductive loop and a second receiver having a second inductive loop, said inductive loops being arranged in a configuration to define three areas, a first of the areas being within the first inductive loop of the first receiver and outside of the second inductive loop of the second receiver, a second of the areas being within the inductive loops of both receivers, and the third area being outside the inductive loop of the first receiver and within the inductive loop of the second receiver, and a switching means coupled to receive signals from said receivers and operable to pass a selected signal indicative of the direction of travel of the vehicle, said switching means being operable to pass a first selected signal when the responder device moves into the location of the interrogator station by initially entering the first area of the loops and being further operable to pass a second selected signal when the responder device initially enters the third area of the loops.

3. The interrogator-responder signalling system in accordance with claim 2 wherein the switching means comprises a first and a second controllable conduction device, each of said controllable conduction devices being normally biased in a first conduction state, each controllable conduction device being coupled to receive signals from a respective one of the receivers and being operable to change conduction state when a receiver passes signals thereto, said controllable conduction device being cross-coupled with each other whereby a change of the conductive state of one of the devices inhibits change of the conductive state of the other device.

4. The interrogator-responder signalling system in accordance with claim 2 wherein the switching means comprises two transistors each having a control electrode coupled to receive direct voltage levels from a respective one of the receivers, each of said transistors being normally biased into a state of non-conduction, each transistor being operable to change into a state of conduction when the direction current level from the respective receiver is changed, said transistors being cross-coupled with each other such that when one of the transistors is rendered conductive, the other transistor is inhibited from becoming conductive.

5. An interrogator-responder signalling system comprising an interrogator station at a fixed location along the path of a vehicle to be identified and a responder device movable with the vehicle along the path and into spaced relation with the interrogator station, said interrogator station including a transmitter and an inductive loop associated with the transmitter for generating an interrogator signal including a carrier wave and a plurality of sideband waves, the responder device including means for detecting the interrogator signal and for deriving audio signals corresponding with the sideband waves of the interrogator signal, said responder device including coding means for passing selected ones of the audio signals and further including oscillator means for generating a response signal having the selected audio signals modulated thereon, said interrogator station including a first receiver having a first inductive loop and a second receiver having a second inductive loop, said inductive loops being in a configuration to define three areas, a first of the areas being within the inductive loop of the first receiver and outside the inductive loop of the second receiver, a second of the areas being within the inductive loops of both receivers, and the third area being outside the inductive loop of the first receiver and within the inductive loop of the second receiver, a first switching means coupled to both receivers and operable to pass another selected audio signal indicative of the direction of travel of the vehicle, and a second switching means coupled to both receivers and operable to pass signals only when both receivers have been activated by the presence of a responder device within the second area defined by the receiver loops.

6. The interrogator-responder signalling system in accordance with claim 5 comprising an amplifier for passing signals to a central office location, said second switching means including a transistor coupled between the amplifier and a ground reference potential and being normally conductive to effectively short circuit input signals to the amplifier, said switching means being coupled to receive direct current levels from both receivers, said second switching means being rendered non-conductive by the signal levels from the receivers when the responder device moves into the second area of the receiver loop such that signals are passed to the amplifier from both receivers.

7. An interrogator-responder signalling system comprising a transmitter operable to generate an interrogator signal, a first receiver, a second receiver, and a responder device movable into spaced relation with the transmitter and the receivers, said responder device including two response circuits each being operable to detect the carrier signal and to generate a coded response signal, each of said receivers including an inductive loop and being tuned to receive a respective one of the response signals from the responder device, the inductive loops being arranged to partially overlap such that three areas are defined into which the responder device may move, a first of the areas being included within the loop of the first receiver and outside the loop of the second receiver, a second of the areas being within both receiver loops, and the third area being outside the loop of the first receiver and within the loop of the second receiver, switching means coupled to both receivers for passing a signal when the responder device is within the second area of the receiver loops whereby a combined signal is passed to a central office location including identification information from both receivers.

8. The interrogator-responder signaling system in accordance with claim 7 comprising a frequency changing circuit coupled to receive signals from one of the receivers and operable to pass modified signals to the switching means and the central office location whereby the signals of the two receivers will be distinguishable from each other in the combined signal passed to the central office location.

No references cited.